US012477275B2

(12) United States Patent
Yamamoto

(10) Patent No.: US 12,477,275 B2
(45) Date of Patent: Nov. 18, 2025

(54) SPEAKER DEVICE AND ACOUSTIC SYSTEM

(71) Applicant: FOSTER ELECTRIC COMPANY, LIMITED, Tokyo (JP)

(72) Inventor: Takeshi Yamamoto, Akishima (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 271 days.

(21) Appl. No.: 18/192,637

(22) Filed: Mar. 29, 2023

(65) Prior Publication Data

US 2023/0328436 A1 Oct. 12, 2023

(30) Foreign Application Priority Data

Mar. 30, 2022 (JP) ................................ 2022-057269

(51) Int. Cl.

| | |
|---|---|
| ***H04R 3/04*** | (2006.01) |
| ***H04R 1/02*** | (2006.01) |
| ***H04R 1/28*** | (2006.01) |
| ***H04R 9/02*** | (2006.01) |
| ***H04R 9/04*** | (2006.01) |
| ***H04R 9/06*** | (2006.01) |

(52) U.S. Cl.

CPC .............. *H04R 3/04* (2013.01); *H04R 1/025* (2013.01); *H04R 1/2826* (2013.01); *H04R 9/043* (2013.01); *H04R 9/06* (2013.01); *H04R 9/025* (2013.01); *H04R 2430/01* (2013.01)

(58) Field of Classification Search

None

See application file for complete search history.

(56) References Cited

U.S. PATENT DOCUMENTS 5,181,251 A * 1/1993 Schultheiss .............. H04R 3/04 381/59

FOREIGN PATENT DOCUMENTS

| | | | |
|---|---|---|---|
| JP | 2010-063078 A | 3/2010 | |
| JP | 2016-171556 A | 9/2016 | |
| WO | WO-2019191186 A1 * | 10/2019 | ............... H03G 1/02 |

OTHER PUBLICATIONS

Office Action in JP Application No. 2022-057269 dated Sep. 2, 2025, 5 pages.

* cited by examiner

*Primary Examiner* — Kenny H Truong

(74) *Attorney, Agent, or Firm* — MARSHALL, GERSTEIN & BORUN LLP

(57) ABSTRACT

A speaker device includes: a limiting unit that limits a signal band of a sound source signal that has been input; a speaker unit that includes a diaphragm; a housing that houses the speaker unit; and a drive circuit that, based on the sound source signal with the limited signal band, outputs a control signal that causes the diaphragm of the speaker unit to vibrate, wherein: the limiting unit limits the sound source signal to a frequency band including a peak frequency of frequency characteristics of an amplitude of the speaker unit in accordance with a shape of the speaker unit and a shape of the housing.

6 Claims, 8 Drawing Sheets

SPEAKER DEVICE AND ACOUSTIC SYSTEM

CROSS-REFERENCE TO RELATED APPLICATION

This application is based on and claims priority under 35 USC 119 from Japanese Patent Application No. 2022-057269 filed on Mar. 30, 2022, the disclosure of which is incorporated by reference herein.

BACKGROUND

Technical Field

The present disclosure relates to a speaker device and an acoustic system.

Related Art

Conventionally, a speaker device that can be made thin (for example, Japanese Patent Application Laid-Open (JP-A) No. 2010-63078) is known. This speaker device is configured by installing plural speaker units in a cabinet, each of the speaker units having a radiating surface from which sound waves are radiated and a back surface that is opposite from the radiating surface.

In the prior art, there is room for improvement in realizing a speaker device that has a simple configuration and is thin.

SUMMARY

An object of the present disclosure is to provide a speaker device and an acoustic system which have a simple configuration and can be made thin.

A first aspect of the present disclosure is a speaker device that includes: a limiting unit that limits a signal band of a sound source signal that has been input; a speaker unit that includes a diaphragm; a housing that houses the speaker unit; and a drive circuit that, based on the sound source signal with the limited signal band, outputs a control signal that causes the diaphragm of the speaker unit to vibrate, wherein: the limiting unit limits the sound source signal to a frequency band that includes a peak frequency of frequency characteristics of an amplitude of the speaker unit in accordance with a shape of the speaker unit and a shape of the housing.

A second aspect of the present disclosure is an acoustic system that includes: the speaker device of the first aspect; a signal input unit that receives the sound source signal; and an amplifier that outputs the received sound source signal to the speaker device.

Effect of the Invention

According to the present disclosure, it is possible to provide a speaker device and an acoustic system which have a simple configuration and can be made thin.

BRIEF DESCRIPTION OF THE DRAWINGS

Exemplary embodiments of the present disclosure will be described in detail based on the following figures, wherein.

DETAILED DESCRIPTION

Detailed explanation follows regarding the exemplary embodiments of the present disclosure, with reference to the drawings.

Summary of Exemplary Embodiments of the Present Disclosure

Movable parts and fixed parts exist as a structure of a speaker unit of a speaker device. It is necessary to set a clearance between parts so that these parts do not hit against each other during operation.

The total height of the speaker unit of the speaker device is determined from the dimension of each component and the clearance dimension between the fixed parts and the movable parts which ensures a necessary stroke amount. Further, the amplitude of the components of the speaker unit is proportional to the output sound pressure under the same frequency.

Therefore, in the exemplary embodiments of the present disclosure, the amplitude and the output sound pressure characteristics are controlled by providing a resonant structure at an enclosure.

Figure 1A:
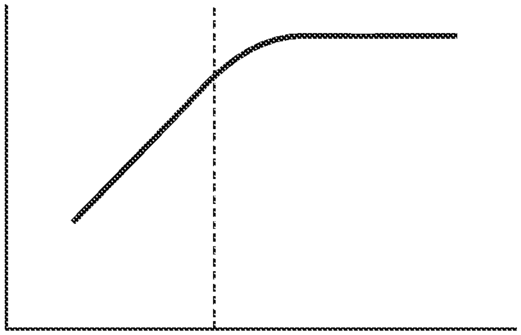
FIG. 1A is a graph illustrating frequency characteristics of sound pressure directly output from a speaker unit.
Figure 1B:
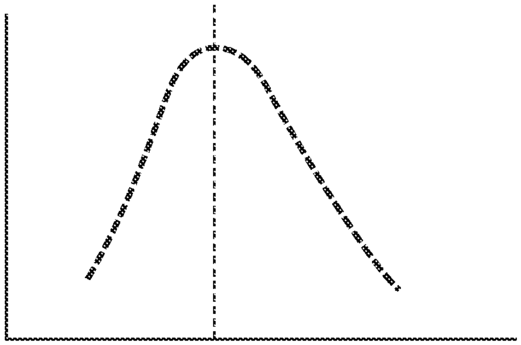
FIG. 1B is a graph illustrating frequency characteristics of sound pressure output from a duct.
Figure 1C:
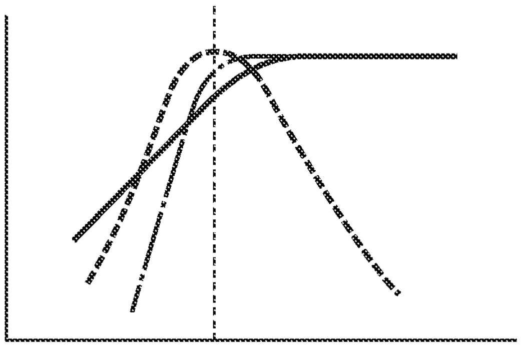
FIG. 1C is a graph illustrating frequency characteristics obtained by synthesizing sound pressure directly output from a speaker unit and sound pressure output from a duct.

For example, in an acoustic system using a bass reflex type enclosure, by synthesizing the sound pressure characteristics (FIG. 1A) directly output from the speaker unit and the sound pressure characteristics (FIG. 1B) output from the duct, frequency characteristics of the sound pressure of the entire speaker device are determined (FIG. 1C). In FIG. 1C, the solid line indicates the sound pressure characteristics directly output from the speaker unit, the dashed line indicates the sound pressure characteristics output from the duct, and the alternate long and short dash line indicates the frequency characteristics of sound pressure of the entire speaker device.

Figure 2:
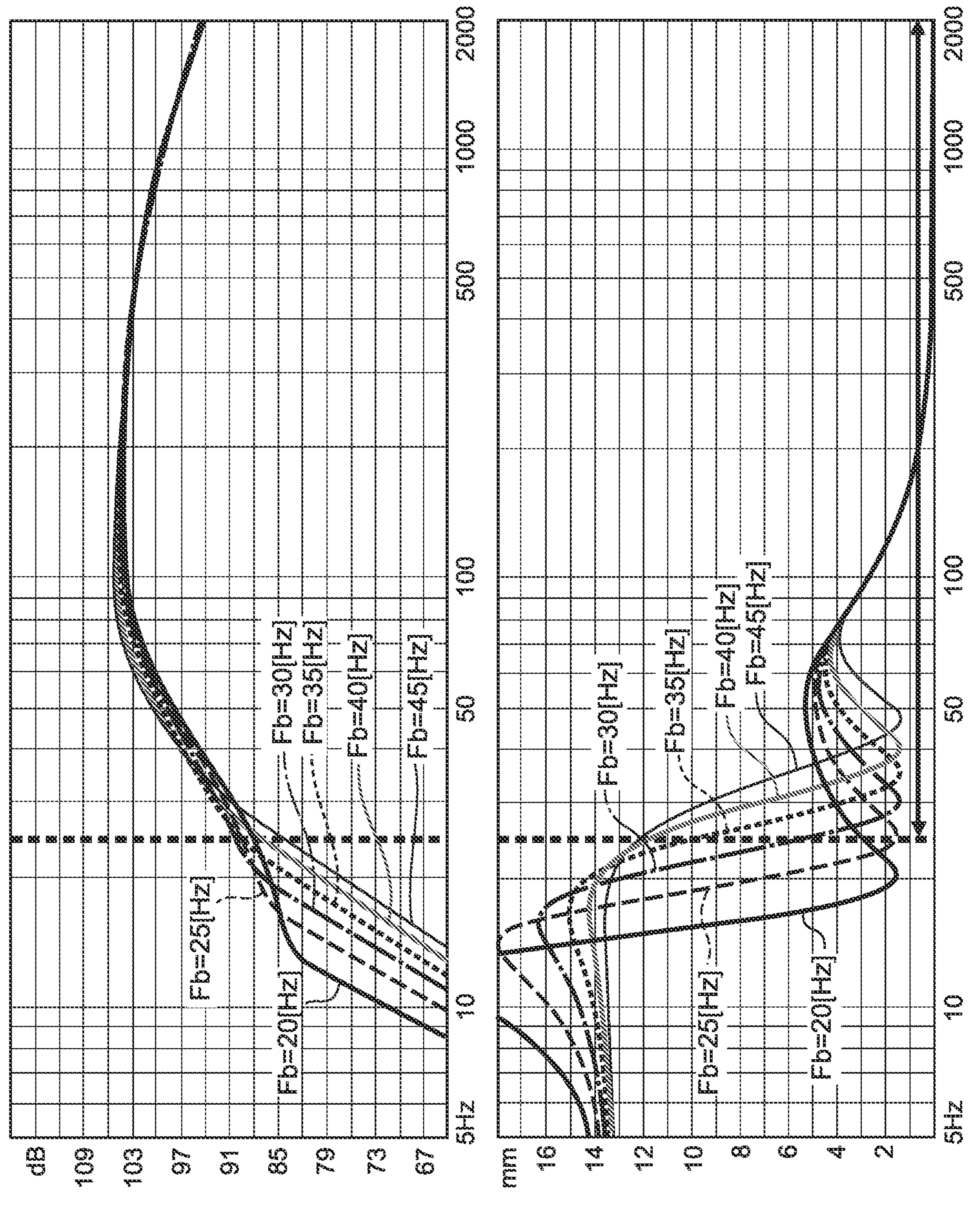
FIG. 2 is graphs illustrating sound pressure characteristics output from an entire acoustic system and amplitude characteristics of a speaker unit.

Therefore, by adjusting the resonance frequency of the duct, the amplitude characteristics of the speaker unit can be adjusted, that is, the maximum amplitude of the speaker unit can be adjusted (see FIG. 2). The upper graph of FIG. 2 is a graph illustrating sound pressure characteristics output from the entire acoustic system, and the lower graph of FIG. 2 is a graph illustrating amplitude characteristics of the speaker unit.

As illustrated in FIG. 2, the band of the input signal to the speaker unit is limited. In FIG. 2, by limiting the frequency band at the lower side of the frequency indicated by the dotted line (for example, the frequency band below 25 Hz) so as to avoid the maximum amplitude peak, the amplitude of the speaker unit is reduced, and therefore, the clearance between the movable parts can be set smaller.

Further, since the clearance dimension between the movable parts can be reduced, it is possible to make the speaker unit thinner, and it is possible to make the enclosure thinner.

In addition, the adoption of a bass reflex type enclosure does not significantly impair the acoustic output compared to a conventional structure.

First Exemplary Embodiment

Configuration of the Acoustic System according to the First Exemplary

Embodiment of the Present Disclosure

Figure 3:
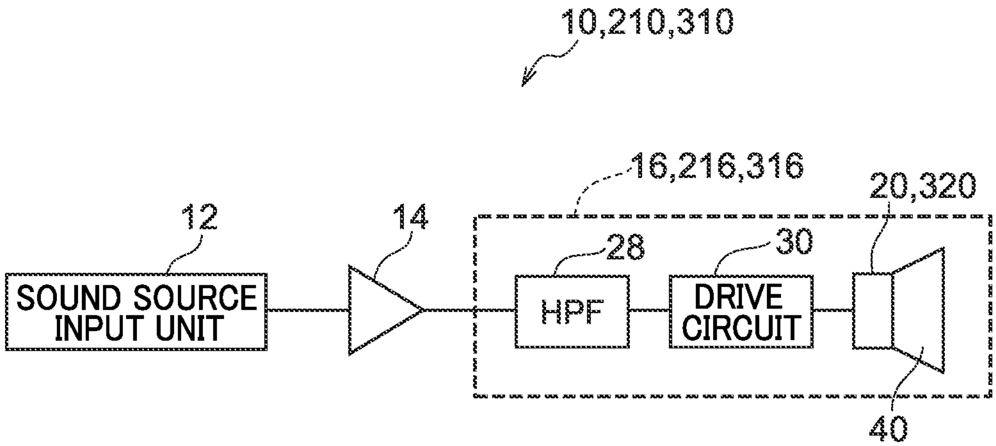
FIG. 3 is a schematic view of an acoustic system according to a first, a second, and a third exemplary embodiment of the present disclosure.

FIG. 3 is a schematic view of an acoustic system 10 according to an exemplary embodiment of the present disclosure.

As illustrated in FIG. 3, the acoustic system 10 includes a sound source input unit 12, an amplifier 14, and a speaker device 16.

The sound source input unit 12 receives a sound source signal.

The amplifier 14 outputs the received sound source signal to the speaker device 16.

Figure 4:
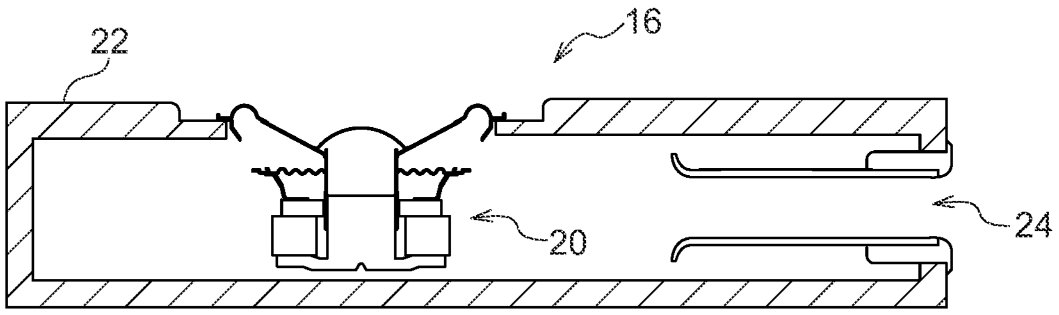
FIG. 4 is a cross-sectional view illustrating the configuration of a speaker device according to the first exemplary embodiment of the present disclosure.

As illustrated in FIG. 4, the speaker device 16 includes a speaker unit 20 and an enclosure 22 that houses the speaker unit 20. In the present exemplary embodiment, the enclosure 22 is a rectangular parallelepiped housing and is a bass reflex type enclosure. The enclosure 22 includes a duct 24.

Further, the speaker device 16 includes a high-pass filter 28 to which the sound source signal is input, a drive circuit 30 that outputs a control signal that causes a diaphragm 40 (see FIG. 5) of the speaker unit 20 to vibrate based on the output of the high-pass filter 28, and the speaker unit 20.

Figure 5:
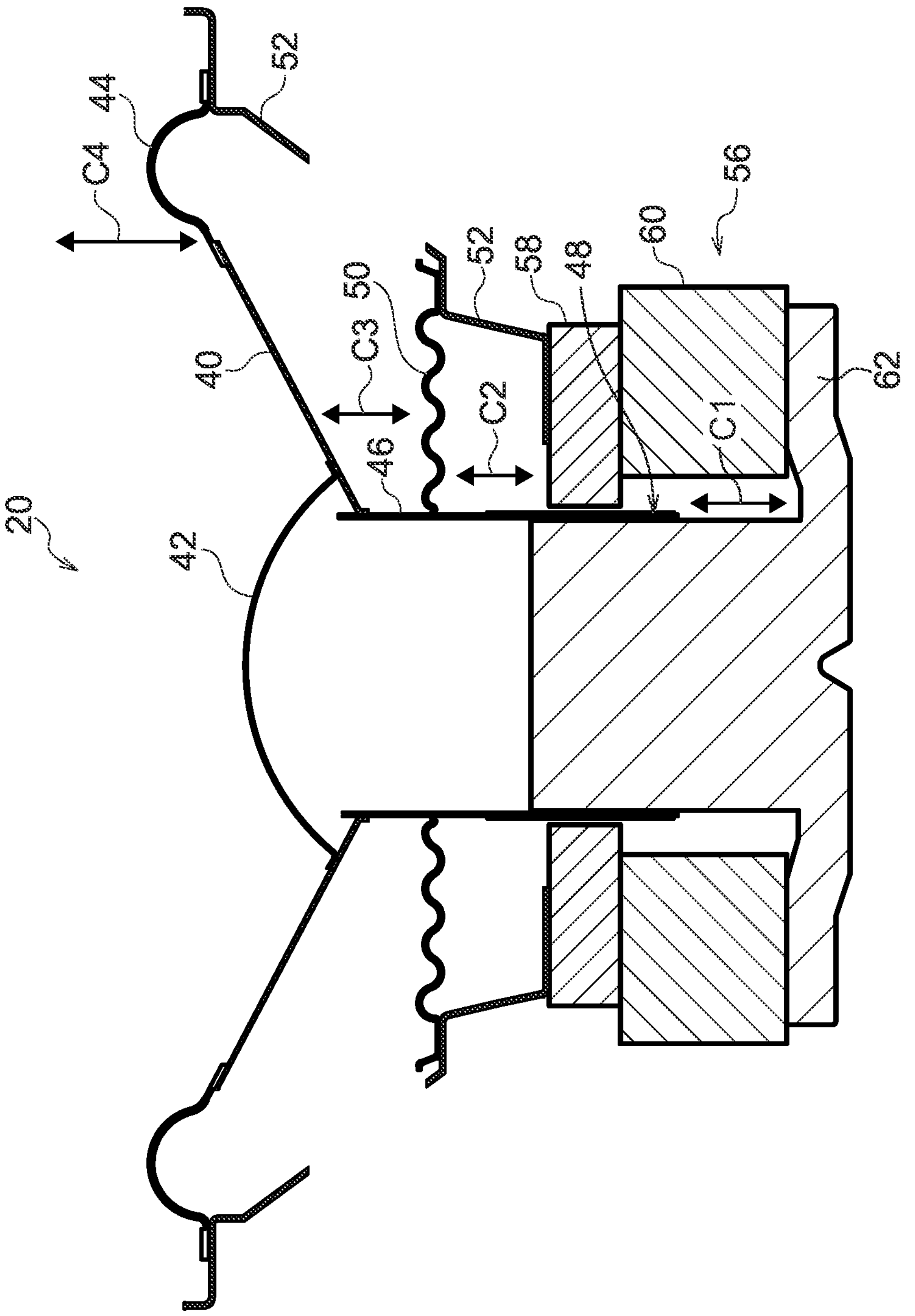
FIG. 5 is a cross-sectional view illustrating the configuration of a speaker unit of the speaker device according to the first exemplary embodiment of the present disclosure.

As illustrated in FIG. 5, the speaker unit 20 includes the diaphragm 40. The diaphragm 40 is formed in an annular shape as seen in a front view, and has a cone-shaped front surface that is recessed toward the central portion. The diaphragm 40 is configured by, as an example, cone paper (a cone made of a material including pulp fibers or the like). A center cap 42 is arranged at a front central portion side of the diaphragm 40. As an example, the center cap 42 is formed in a dome shape, and is arranged so that a center portion of the center cap 42 bulges forward.

An outer peripheral portion of the center cap 42 is formed in a flange shape over the entire circumference and is joined to the front surface of the diaphragm 40. An edge 44 made from an elastic material such as rubber is joined to an outer peripheral portion of the diaphragm 40 over the entire circumference. The edge 44 is formed in an annular shape as seen in a front view, and is joined to a frame 52 over the entire circumference.

A circular hole is formed through a central portion of the diaphragm 40, and the edge of the circular hole is joined to a front portion of an outer peripheral surface of a voice coil bobbin 46. The voice coil bobbin 46 is a film made to be in a cylindrical shape. In the drawings, the cross sections of the diaphragm 40, the center cap 42, the edge 44, the voice coil bobbin 46, a voice coil 48, a damper 50, and the frame 52 are indicated by thick lines for the sake of convenience. The voice coil 48, which is configured by an electric wire (as an example, copper wire), which is a linear conductor, is wound around an outer peripheral side of a rear portion of the voice coil bobbin 46. Note that the cross section of the voice coil 48 is simplified for illustration.

An inner peripheral portion of the damper 50 is joined to the outer peripheral surface of voice coil bobbin 46 at a portion further to the rear side than the circular hole of the diaphragm 40. The damper 50 is a flexible thin plate member formed in an annular shape as seen in a front view and has a wave-like corrugated portion. The voice coil bobbin 46 is connected to the frame 52 via the damper 50 or the like, and is supported by the damper 50 or the like in a state such that the voice coil bobbin 46 can vibrate with respect to the frame 52, along the cylinder axis direction of the voice coil bobbin 46. Further, the diaphragm 40 is connected to the frame 52 via the edge 44, and is supported by the edge 44 in a state such that the diaphragm 40 can vibrate with respect to the frame 52, along the cylinder axis direction of the voice coil bobbin 46. Further, the above-described diaphragm 40 vibrates integrally with the voice coil bobbin 46.

An external magnetic circuit 56 is provided at the rear of the speaker unit 20. The magnetic circuit 56 is configured by a plate 58, a magnet 60, and a yoke 62. The plate 58 is made of an electromagnetic material, is formed in an annular shape, is arranged at an outer peripheral side of the voice coil 48, and is fixed to a rear surface of a bottom wall portion of the frame 52. The magnet 60 is formed in an annular shape, is arranged at the outer peripheral side of the voice coil 48, and is fixed to the rear surface of the plate 58. The yoke 62 is fixed to a rear surface of the magnet 60.

The yoke 62 is formed of an electromagnetic material, and includes a disc-shaped base portion that constitutes a rear end portion of the yoke 62, and a columnar pole portion that protrudes forward from a center portion of the base portion.

A part of the pole portion is arranged in a space at the inner peripheral side at the rear portion of the voice coil bobbin 46. The voice coil 48 and the voice coil bobbin 46 are inserted into the magnetic gap between an inner peripheral surface of the plate 58 and the pole portion of the yoke 62.

The voice coil 48 is connected to an external power source via a terminal (not shown in the drawings).

The drive circuit 30 outputs a control signal obtained, via the high-pass filter 28, from the sound source signal that has been input, to the voice coil 48, and causes the diaphragm 40 of speaker unit 20 to vibrate by the magnetic circuit 56.

The high-pass filter 28 limits a low frequency side of the signal band of the sound source signal that has been input.

Specifically, the high-pass filter 28 limits the sound source signal to a low-side frequency band including the peak frequency of the frequency characteristics of the sound pressure output in accordance with the shape of the enclosure 22 (limits the sound source signal to a frequency band to the left of the dotted line in FIG. 2).

The enclosure 22 includes the duct 24 as a resonant structure, and the duct 24 has a shape that results in a resonance frequency that is determined so as to adjust the system resonance frequency. For example, the duct 24 has a duct resonance frequency that adjusts the system resonance frequency corresponding to the upper limit of the frequency band to be limited (for example, 25 Hz indicated by the dotted line in FIG. 2). The system resonance frequency refers to the resonance frequency of the entire acoustic system. Further, the system resonance frequency is preferably a frequency that optimizes the sound pressure characteristics, the amplitude, and the like of the acoustic system.

More specifically, by lengthening or narrowing the shape of the duct 24, the duct resonance frequency is lowered, and in accordance therewith, a system resonance frequency with an anti-resonance frequency or a Hermholtz resonance frequency reduced to a lower than conventional value is set to a lower value. In the examples in FIG. 2, examples of a system resonance frequency of 40 Hz, 35 Hz, 30 Hz, 25 Hz, and 20 Hz, which are lower than compared to a conventional design in which the system resonance frequency is 45 Hz, are illustrated. Here, the anti-resonance frequency is a frequency at which phase reversal occurs for each sound pressure radiated from the diaphragm 40 and the duct 24 when looking at the entire acoustic system. In the band below the anti-resonance frequency, there is an anti-phase relationship (the sound pressure is reduced), and in the band above the anti-resonance frequency, there is an in-phase relationship (the sound pressure is strengthened). In the speaker unit, the amplitude characteristics becomes minimal near the anti-resonance frequency.

As illustrated in the examples of FIG. 2, the maximum amplitude of the speaker unit 20 can be suppressed at the higher frequency side than the low-side frequency band to be limited.

Therefore, in the present exemplary embodiment, the speaker unit 20 is configured such that the clearance between parts of the speaker unit 20 is determined according to this maximum amplitude. Specifically, a clearance C1 between the voice coil 48 and the yoke 62, a clearance C2 between the damper 50 and the plate 58, a clearance C3 between the damper 50 and the diaphragm 40, and a clearance C4 between a front part (for example, a grill cover) and the diaphragm 40 are configured so as to be clearances obtained by adding the maximum amplitude and a predetermined margin.

Operation of the Acoustic System according to the First Exemplary Embodiment of the Present Disclosure The sound source input unit 12 receives an input of a sound source signal from an audio player or the like.

The amplifier 14 outputs the received sound source signal to the speaker device 16.

The high-pass filter 28 of the speaker device 16 limits the low-frequency side of the signal band of the sound source signal and outputs the sound source signal to the drive circuit 30.

Based on the sound source signal with the limited low-frequency side of the signal band, the drive circuit 30 outputs the control signal to speaker unit 20 and causes the diaphragm 40 of the speaker unit 20 to vibrate.

The high-pass filter 28 limits the sound source signal to a low-side frequency band including the peak frequency of the frequency characteristics of the sound pressure output in accordance with the shape of the enclosure 22 (limits the sound source signal to a frequency band at a lower side than the dotted line in FIG. 2). Further, the duct 24 of the enclosure 22 has a duct resonance frequency that adjusts the system resonance frequency corresponding to the upper limit of the frequency band to be limited.

As a result thereof, the maximum amplitude of the speaker unit 20 can be suppressed at the higher frequency side than the low-side frequency band to be limited.

Since the clearance between parts of the speaker unit 20 is configured to be determined in accordance with the maximum amplitude, it is possible to make the speaker unit 20 thinner.

As described above, in the acoustic system according to the first exemplary embodiment of the present disclosure, the sound source signal is limited to a low-side frequency band including the peak frequency of the frequency characteristics of the sound pressure output in accordance with the shape of the enclosure 22, and the drive circuit 30 causes the diaphragm 40 of the speaker unit 20 to vibrate based on the sound source signal with the limited signal band, and therefore, can provide a speaker device that has a simple configuration and can be made thin.

In addition, compared to a case in which a low-side frequency band including the peak frequency of the frequency characteristics of the sound pressure output in accordance with the shape of the enclosure 22 is not limited, the amplitude of the speaker unit is reduced, and therefore, it is possible to set a smaller clearance between the movable parts and it is possible to make the speaker unit thinner. Further, by using a bass reflex type enclosure, the acoustic output is not greatly impaired.

Second Exemplary Embodiment

Next, explanation follows regarding an acoustic system according to a second exemplary embodiment. Note that parts having the same configuration as in the first exemplary embodiment are denoted by the same reference numerals, and explanations thereof are omitted.

The second exemplary embodiment differs from the first exemplary embodiment in that a passive radiator is used.

As illustrated in FIG. 3, an acoustic system 210 includes the sound source input unit 12, the amplifier 14, and a speaker device 216.

Figure 6:
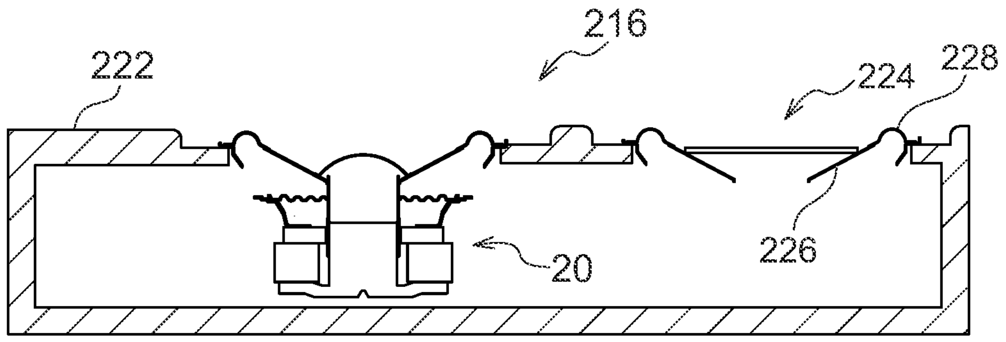
FIG. 6 is a cross-sectional view illustrating the configuration of a speaker device according to the second exemplary embodiment of the present disclosure.

As illustrated in FIG. 6, the speaker device 216 includes the speaker unit 20 and an enclosure 222 that houses the speaker unit 20. In the present exemplary embodiment, the enclosure 222 is a rectangular parallelepiped housing and is a passive radiator type enclosure. The enclosure 222 includes a passive radiator 224.

The enclosure 222 includes the passive radiator 224 as a resonant structure, and the passive radiator 224 includes a diaphragm 226 and an edge 228 which result in a resonance frequency that is determined so as to adjust the system resonance frequency. For example, the passive radiator 224 has a passive radiator resonance frequency that adjusts the system resonance frequency corresponding to the upper limit of the frequency band to be limited.

More specifically, by adjusting the weight of the diaphragm 226 and the size of the spring of the edge 228, the passive radiator resonance frequency is made to be a lower than conventional value, and in accordance therewith, the system resonance frequency is set to a lower value.

Since other configuration and operation of the acoustic system 210 according to the second exemplary embodiment are the same as those in the first exemplary embodiment, explanation thereof is omitted.

Third Exemplary Embodiment

Next, explanation follows regarding an acoustic system according to a third exemplary embodiment. Note that parts having the same configuration as in the first exemplary embodiment are denoted by the same reference numerals, and explanations thereof are omitted.

The third exemplary embodiment differs from the first exemplary embodiment in that a counter-drive type speaker unit is used.

As illustrated in FIG. 3, the acoustic system 10 includes the sound source input unit 12, the amplifier 14, and a speaker device 316.

Further, the speaker device 316 includes the high-pass filter 28, the drive circuit 30, and a speaker unit 320.

Figure 7:
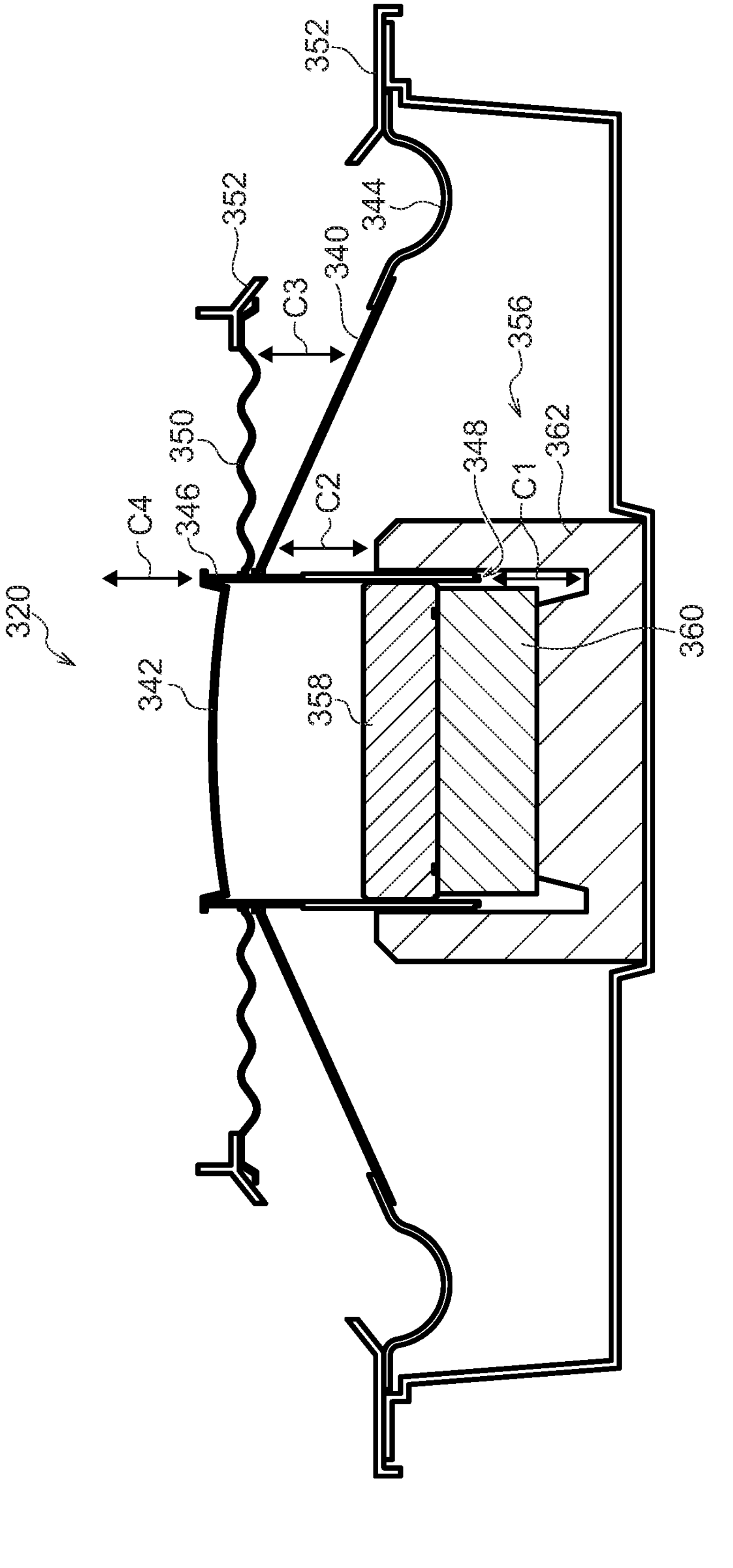
FIG. 7 is a cross-sectional view illustrating the configuration of a speaker unit of a speaker device according to the third exemplary embodiment of the present disclosure.

As illustrated in FIG. 7, the speaker unit 320 includes a diaphragm 340. The diaphragm 340 is formed in an annular shape as seen in a front view, and has a cone-shaped front surface that is convex toward the central portion. A center cap 342 is arranged at a front central portion side of the diaphragm 340. An edge 344 made from an elastic material such as rubber is joined to an outer peripheral portion of the diaphragm 340 over the entire circumference. The edge 344 is formed in an annular shape as seen in a front view, and is joined to a frame 352 over the entire circumference.

A circular hole is formed through a central portion of diaphragm 340, and the edge of the circular hole is joined to a front portion of an outer peripheral surface of a voice coil bobbin 346. In the drawings, the cross sections of the diaphragm 340, the center cap 342, the edge 344, the voice coil bobbin 346, a voice coil 348, a damper 350, and the frame 352 are indicated by thick lines for the sake of convenience. The voice coil 348 is wound around a rear outer peripheral side of the voice coil bobbin 346. Note that the cross section of the voice coil 348 is simplified for illustration.

An inner peripheral portion of damper 350 is joined to the outer peripheral surface of voice coil bobbin 346 at a portion further to the front side than the circular hole of the diaphragm 340. The damper 350 is a flexible thin plate member formed in an annular shape as seen in a front view and has a wave-like corrugated portion. The voice coil bobbin 346 is connected to the frame 352 via the damper 350 or the like, and is supported by the damper 350 or the like in a state such that the voice coil bobbin 346 can vibrate with respect to the frame 352, along the cylinder axis direction of the voice coil bobbin 346. Further, the diaphragm 340 is connected to the frame 352 via the edge 344, and is supported by the edge 344 in a state such that the diaphragm 340 can vibrate with respect to the frame 352, along the cylinder axis direction of the voice coil bobbin 346. Further, the above-described diaphragm 340 vibrates integrally with the voice coil bobbin 346.

An external magnetic circuit 356 is provided at the rear of the speaker unit 320. The magnetic circuit 356 is configured by a plate 358, a magnet 360, and a yoke 362.

The drive circuit 30 outputs a control signal obtained, via the high-pass filter 28, from the sound source signal that has been input, to the voice coil 348, and causes the diaphragm 340 of speaker unit 320 to vibrate by magnetic circuit 356.

Further, in the same manner as in the above-described first exemplary embodiment, the maximum amplitude of the speaker unit 320 can be suppressed at the higher frequency side than the low-side frequency band to be limited.

Therefore, in the present exemplary embodiment, the speaker unit 320 is configured such that the clearance between parts of the speaker unit 20 is determined according to this maximum amplitude. Specifically, the speaker unit 320 is configured such that a clearance C1 between the voice coil 348 and the yoke 362, a clearance C2 between the diaphragm 340 and the yoke 362, a clearance C3 between the damper 350 and the diaphragm 340, and a clearance C4 between a front part (for example, a grill cover) and the voice coil bobbin 346 are clearances obtained by adding the maximum amplitude and a predetermined margin.

Since other configuration and operation of the acoustic system 310 according to the third exemplary embodiment are the same as those in the first exemplary embodiment, explanation thereof is omitted.

EXAMPLES

Explanation follows regarding an example of the acoustic system described in the first exemplary embodiment. In the example, the capacity of the enclosure was set to 10 L, and the anti-resonance frequency or Helmholtz resonance frequency was adjusted to be lower than that of a conventional bass reflex type design.

An acoustic system using a closed type enclosure having the same capacity as the enclosure according to the first exemplary embodiment and an acoustic system having an infinite spatial volume at the rear side are comparative examples.

Figure 8:
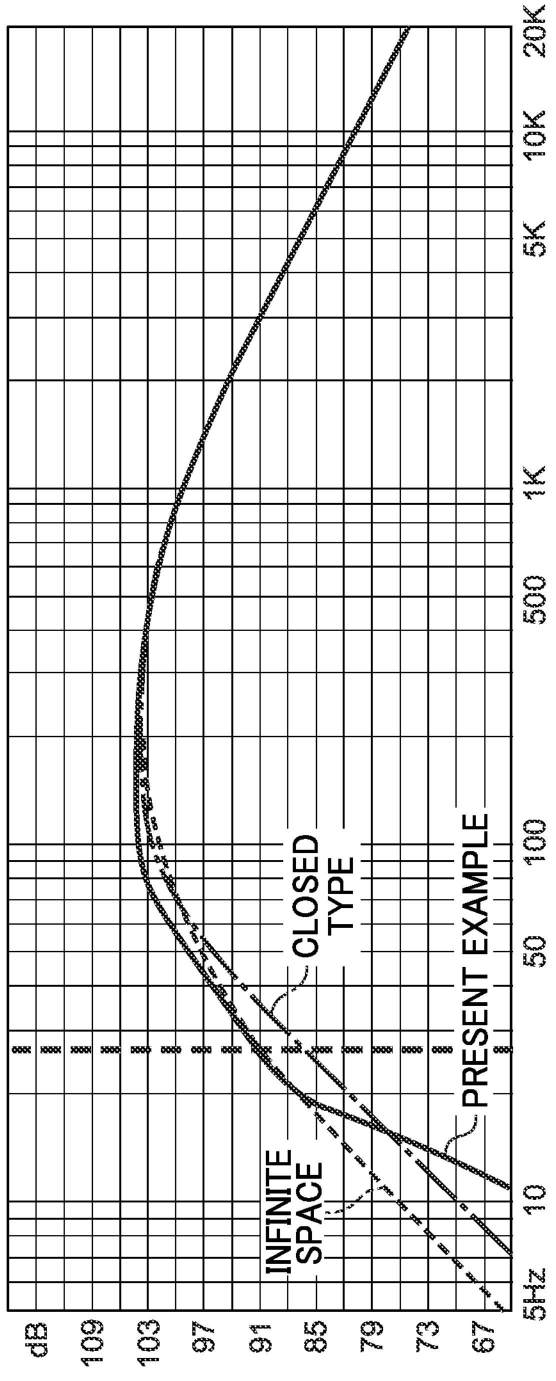
FIG. 8 is a graph illustrating frequency characteristics of sound pressure of the entire acoustic system in the examples.

FIG. 8 is a graph illustrating frequency characteristics of sound pressure of the entire acoustic system in the acoustic system described in the first exemplary embodiment and the comparative examples. Further, FIG. 9 is a graph illustrating amplitude characteristics of the speaker unit in the acoustic system described in the first exemplary embodiment and in the comparative examples.

Figure 9:
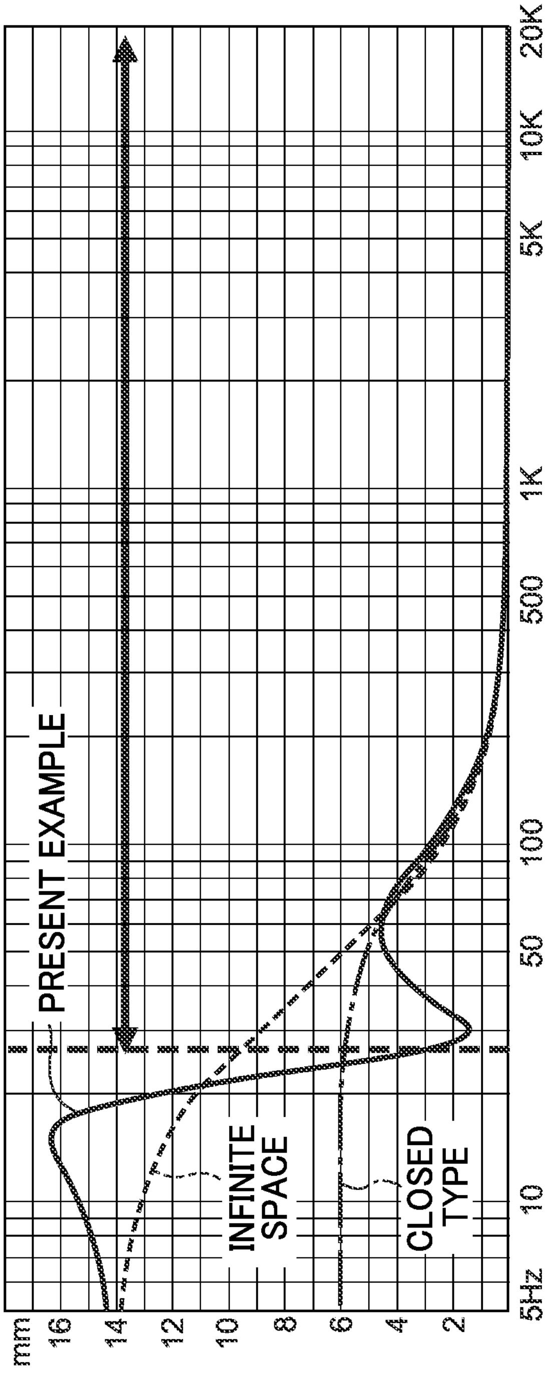
FIG. 9 is a graph illustrating amplitude characteristics of the speaker unit in the examples.

From FIG. 8 and FIG. 9, it was found that the acoustic system described in the first exemplary embodiment can achieve sound pressure equal to or greater than the acoustic system of the comparative examples which had an enclosure volume equal to or greater than that of the acoustic system described in the first exemplary embodiment, while reducing the amplitude of the speaker unit.

According to the present disclosure, the limiting unit limits the sound source signal to a frequency band including a peak frequency of frequency characteristics of an amplitude of the speaker unit in accordance with the shape of the speaker unit and the shape of the housing. Further, the drive circuit outputs, based on the sound source signal with the limited signal band, a control signal that causes the diaphragm of the speaker unit to vibrate. The housing is, for example, a speaker enclosure, a rear-opening enclosure for a speaker, vehicle interior parts (trim, pillars, instrument panels, headlining, luggage, trunk room or the like) or plate parts. Furthermore, the peak frequency is the frequency at which the maximum point or the maximum amplitude value is obtained.

As described above, the sound source signal is limited to a frequency band including a peak frequency of frequency characteristics of an amplitude of the speaker unit in accordance with the shape of the speaker unit and the shape of the housing, and the drive circuit causes the diaphragm of the speaker unit to vibrate based on the sound source signal with the limited signal band. As a result, it is possible to provide a speaker device that has a simple configuration and that can be made thin.

The housing according to the present disclosure can include a resonant structure.

The housing according to the present disclosure is a bass reflex type enclosure, and the resonant structure is a duct.

The limiting unit according to the present disclosure can limit a low-side frequency band.

The housing according to the present disclosure includes a resonant structure, and the resonant structure can have a resonance frequency that adjusts a system resonance frequency corresponding to an upper limit of a frequency band to be limited.

The clearance between parts of the speaker unit according to the present disclosure can be configured so as to be a clearance that is determined in accordance with a maximum amplitude of the speaker unit.

The speaker unit according to the present disclosure further includes a damper, a voice coil, a yoke, and a plate, and the speaker unit can be configured so that the clearance between the damper and the diaphragm, the clearance between the voice coil and the yoke, and the clearance between the damper and the plate are clearances that are determined in accordance with the maximum amplitude.

The speaker unit can be configured such that a clearance between the speaker device according to the present disclosure and a part arranged corresponding to the speaker device is a clearance determined in accordance with the maximum amplitude.

The speaker unit according to the present disclosure can be a counter-drive type speaker unit.

According to the present disclosure, a signal input unit receives the sound source signal. The amplifier outputs the received sound source signal to the speaker device. Then, in the speaker device, the sound source signal is limited to a frequency band including a peak frequency of frequency characteristics of an amplitude of the speaker unit in accordance with the shape of the speaker unit and the shape of the housing, and the drive circuit causes the diaphragm of the speaker unit to vibrate based on the sound source signal with the limited signal band. As a result, it is possible to provide a speaker device that has a simple configuration and that can be made thin.

The present disclosure is not limited to the above-described exemplary embodiments, and various modifications and applications are possible within a range that does not depart from the gist of the technique of the present disclosure.

For example, although the case of using a bass reflex type enclosure or a passive radiator type enclosure has been described as an example in the above-described exemplary embodiments, the present invention is not limited thereto. The enclosure may be an enclosure having a resonant structure other than a duct or a passive radiator.

What is claimed is:

1. A speaker device comprising:
a limiting unit that limits a signal band of a sound source signal that has been input;
a speaker unit that includes a diaphragm;
a housing that houses the speaker unit and includes a resonant structure; and
a drive circuit that, based on the sound source signal with the limited signal band, outputs a control signal that causes the diaphragm of the speaker unit to vibrate, wherein:
the limiting unit limits the sound source signal to a frequency band that includes a peak frequency of frequency characteristics of an amplitude of the speaker unit in accordance with a shape of the speaker unit and a shape of the housing;
the housing is a base reflex type enclosure; and
the resonant structure is a duct.

2. A speaker device comprising:
a limiting unit that limits a signal band of a sound source signal that has been input;
a speaker unit that includes a diaphragm;
a housing that houses the speaker unit; and
a drive circuit that, based on the sound source signal with the limited signal band, outputs a control signal that causes the diaphragm of the speaker unit to vibrate, wherein:
the limiting unit limits the sound source signal to a frequency band that includes a peak frequency of frequency characteristics of an amplitude of the speaker unit in accordance with a shape of the speaker unit and a shape of the housing;
the limiting unit limits a low frequency side of the frequency band;
the housing includes a resonant structure; and
the resonant structure has a resonance frequency that adjusts a system resonance frequency corresponding to an upper limit of the frequency band to be limited.

3. A speaker device comprising:
a limiting unit that limits a signal band of a sound source signal that has been input;
a speaker unit that includes a diaphragm;
a housing that houses the speaker unit; and
a drive circuit that, based on the sound source signal with the limited signal band, outputs a control signal that causes the diaphragm of the speaker unit to vibrate, wherein:
the limiting unit limits the sound source signal to a frequency band that includes a peak frequency of frequency characteristics of an amplitude of the speaker unit in accordance with a shape of the speaker unit and a shape of the housing, and
a clearance between parts of the speaker unit is based on a maximum amplitude of the speaker unit.

4. The speaker device according to claim 3, wherein:
the speaker unit further comprises a damper, a voice coil, a yoke, and a plate; and
the speaker unit is configured such that a clearance between the damper and the diaphragm, a clearance between the voice coil and the yoke, and a clearance between the damper and the plate are based on the maximum amplitude of the speaker unit.

5. The speaker device according to claim 3, wherein the speaker unit is configured such that a clearance between the speaker unit and parts arranged in the speaker device is based on the maximum amplitude of the speaker unit.

6. A speaker device comprising:
a limiting unit that limits a signal band of a sound source signal that has been input;
a speaker unit that includes a diaphragm;
a housing that houses the speaker unit; and
a drive circuit that, based on the sound source signal with the limited signal band, outputs a control signal that causes the diaphragm of the speaker unit to vibrate, wherein:
the limiting unit limits the sound source signal to a frequency band that includes a peak frequency of frequency characteristics of an amplitude of the speaker unit in accordance with a shape of the speaker unit and a shape of the housing, and
the speaker unit is a counter drive type speaker unit.

* * * * *